(12) United States Patent
Yang

(10) Patent No.: US 9,348,433 B2
(45) Date of Patent: May 24, 2016

(54) OPTICAL TOUCH SENSING STRUCTURE

(71) Applicant: Unimicron Technology Corp., Taoyuan (TW)

(72) Inventor: Ming-Huei Yang, Taipei (TW)

(73) Assignee: Unimicron Technology Corp., Taoyuan (TW)

( * ) Notice: Subject to any disclaimer, the term of this patent is extended or adjusted under 35 U.S.C. 154(b) by 106 days.

(21) Appl. No.: 14/140,541

(22) Filed: Dec. 26, 2013

(65) Prior Publication Data

US 2015/0054790 A1 Feb. 26, 2015

(30) Foreign Application Priority Data

Aug. 22, 2013 (TW) .............................. 102130005 A

(51) Int. Cl.
*G06F 3/042* (2006.01)
*G06F 3/03* (2006.01)
(52) U.S. Cl.
CPC .................................. *G06F 3/0317* (2013.01)
(58) Field of Classification Search
CPC ......... G06F 3/041; G06F 3/045; G06F 3/042; G09G 3/34; G06K 11/06; G08C 21/00
USPC ......................................... 345/107, 173–176
See application file for complete search history.

(56) References Cited

U.S. PATENT DOCUMENTS

| 8,559,096 | B2* | 10/2013 | Gibson | G02F 1/167 345/107 |
|---|---|---|---|---|
| 2012/0319998 | A1* | 12/2012 | Lai et al. | 345/175 |
| 2013/0194655 | A1* | 8/2013 | Yamamoto | G02F 1/0081 359/296 |
| 2013/0278514 | A1* | 10/2013 | Jeon et al. | 345/173 |
| 2014/0168163 | A1* | 6/2014 | Yang et al. | 345/175 |
| 2014/0340430 | A1* | 11/2014 | Telfer | G09G 3/344 345/690 |

FOREIGN PATENT DOCUMENTS

| CN | 102219388 | 10/2011 |
|---|---|---|
| TW | 200630221 | 9/2006 |
| TW | 201118691 | 6/2011 |
| TW | 201133901 | 10/2011 |
| TW | I358030 | 2/2012 |
| TW | 201304172 | 1/2013 |
| TW | M444559 | 1/2013 |

OTHER PUBLICATIONS

"Office Action of Taiwan Counterpart Application," issued on Feb. 13, 2015, p. 1-p. 11.

* cited by examiner

*Primary Examiner* — Pegeman Karimi
(74) *Attorney, Agent, or Firm* — Jianq Chyun IP Office

(57) ABSTRACT

An optical touch sensing structure includes a transparent substrate and a plurality of optical particles with metallic composition. The optical particles with metallic composition are disposed on the transparent substrate. When an infrared is incident on each of the optical particles with metallic composition, the infrared is reflected by each of the optical particles with metallic composition.

12 Claims, 3 Drawing Sheets

OPTICAL TOUCH SENSING STRUCTURE

CROSS-REFERENCE TO RELATED APPLICATION

This application claims the priority benefit of Taiwan application serial no. 102130005, filed on Aug. 22, 2013. The entirety of the above-mentioned patent application is hereby incorporated by reference herein and made a part of this specification.

BACKGROUND OF THE INVENTION

1. Field of the Invention

The invention is directed to a touch sensing structure and more particularly, to an optical touch sensing structure.

2. Description of Related Art

A conventional optical touch sensing structure is composed of a light-colored paper substrate and a plurality of black-ink patterns printed on the light-colored paper substrate. When an infrared emitted by an optical stylus passes through the optical touch sensing structure, the light-colored paper substrate directly reflects or scatters the infrared. The reflected or scattered infrared is also detected by an infrared camera disposed in the optical stylus. When the optical stylus contacts the optical touch sensing structure and moves on the surface of the optical touch sensing structure, a processor determines a position and a movement of a touched point according to the infrared intensity and image change sensed by the infrared camera.

Due to the rough surface of the light-colored paper substrate, the infrared generated by the optical stylus may be reflected and scattered toward a plurality of directions. As such, the infrared camera would capture a reflected image easily. That is to say, the optical stylus may still read a positional signal of a touched point even at a quite large tilting angle. However, the light-colored paper substrate itself is non-transparent, i.e. does not have enough light transmittance, and thus, a portion of light is shielded. Therefore, such type of optical touch sensing structure can not be applied to common displays. Moreover, the light-colored paper substrate reflects and scatters not only the infrared but also light emitted by a display and ambient light from the external, such that the image gets foggy, which leads to reduced contrast and sharpness of the image.

SUMMARY OF THE INVENTION

The invention provides an optical touch sensing structure having a transparent substrate and using optical particles with metallic composition to reflect an infrared so as to identify the position of a touched point and have wider application.

The invention is directed to an optical touch sensing structure including a transparent substrate and a plurality of optical particles with metallic composition. The optical particles with metallic composition are disposed on the transparent substrate. When an infrared is incident on each of the optical particles with metallic composition, the infrared is reflected by each of the optical particles with metallic composition.

In an embodiment of the invention, the optical touch sensing structure further includes a transparent adhesive layer. The transparent adhesive layer is disposed on the transparent substrate, and the optical particles with metallic composition are fixed on the transparent substrate by the transparent adhesive layer. The refractive index of the transparent adhesive layer is identical or similar to the refractive index of the transparent substrate.

In an embodiment of the invention, the transparent adhesive layer completely covers the transparent substrate and the optical particles with metallic composition are distributed in the transparent adhesive layer.

In an embodiment of the invention, the transparent adhesive layer completely covers an upper surface of the transparent substrate and the optical particles with metallic composition are covered by the transparent adhesive layer and arranged in a single layer on the upper surface.

In an embodiment of the invention, the optical touch sensing structure further comprises a plurality of light absorbing portions and a transparent protective layer. The light absorbing portions are disposed on the transparent adhesive layer and expose a portion of the transparent adhesive layer. The transparent protective layer is disposed on the transparent adhesive layer and covers the light absorbing portions and the light absorbing portions exposed by the transparent adhesive layer. The refractive index of the transparent protective layer is identical or similar to the refractive index of the transparent substrate and identical or similar to the refractive index of the transparent adhesive layer.

In an embodiment of the invention, the transparent adhesive layer includes a plurality of transparent adhesive portions. The transparent adhesive portions are separately disposed on the transparent substrate and expose a portion of the transparent substrate. The optical particles with metallic composition are distributed in the transparent adhesive portions.

In an embodiment of the invention, the transparent adhesive layer includes a plurality of transparent adhesive portions. The transparent adhesive portions are separately disposed on an upper surface of the transparent substrate and expose a portion of the upper surface. The optical particles with metallic composition are covered by the transparent adhesive portions and arranged in a single layer on the upper surface.

In an embodiment of the invention, the optical touch sensing structure further includes a transparent protective layer. The transparent protective layer is disposed on the transparent substrate and covers the transparent adhesive portions and the portion of the transparent adhesive portions exposed by the transparent substrate. The refractive index of the transparent protective layer is identical or similar to the refractive index of the transparent adhesive layer and identical or similar to the refractive index of the transparent substrate.

In an embodiment of the invention, the transparent substrate has a plurality of cavities, and the optical particles with metallic composition are disposed in the cavities and arranged in a single layer.

In an embodiment of the invention, the optical touch sensing structure further includes a plurality of transparent positioning portions. The transparent positioning portions are disposed on the transparent substrate, and the optical particles with metallic composition are disposed between the transparent positioning portions and arranged in a single layer. The transparent positioning portions limit positions of the optical particles with metallic composition.

In an embodiment of the invention, the optical touch sensing structure further includes a plurality of light absorbing portions and a transparent protective layer. The light absorbing portions are disposed on the transparent substrate and at least expose a portion of the optical particles with metallic composition. The transparent protective layer is disposed on the transparent substrate and at least covers the light absorbing portions and the portion of the optical particles with metallic composition exposed by the light absorbing portions. The refractive index of the transparent protective layer is identical or similar to the refractive index of the transparent substrate.

In an embodiment of the invention, each of the optical particles with metallic composition is a metallic particle or composed of a glass particle and a metallic layer covering an outer surface of the glass particle.

In an embodiment of the invention, the diameter of each of the optical particles with metallic composition is in a range between 1 to 30 micrometers.

Based on the above, the optical touch sensing structure of the invention includes the transparent substrate and the optical particles with metallic composition, and thus, when a touch device (e.g., an optical stylus) emits an infrared to the optical touch sensing structure, the transparent substrate allows visible light to pass through, while the optical particles with metallic composition reflects the infrared to an infrared camera in the touch device, such that the position of a touched point may be calculated and obtained. Moreover, when the optical touch sensing structure of the invention is subsequently applied to, for example, a common display (e.g., a liquid crystal display, a CRT monitor, or a plasma display), most of the light of the display is also allowed to pass through the transparent substrate based on the disposition so as to prevent the image form getting foggy. Therefore, the optical touch sensing structure of the invention has wider application.

Several exemplary embodiments accompanied with figures are described in detail below to further describe the invention in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the invention.

DESCRIPTION OF EMBODIMENTS

Figure 1:
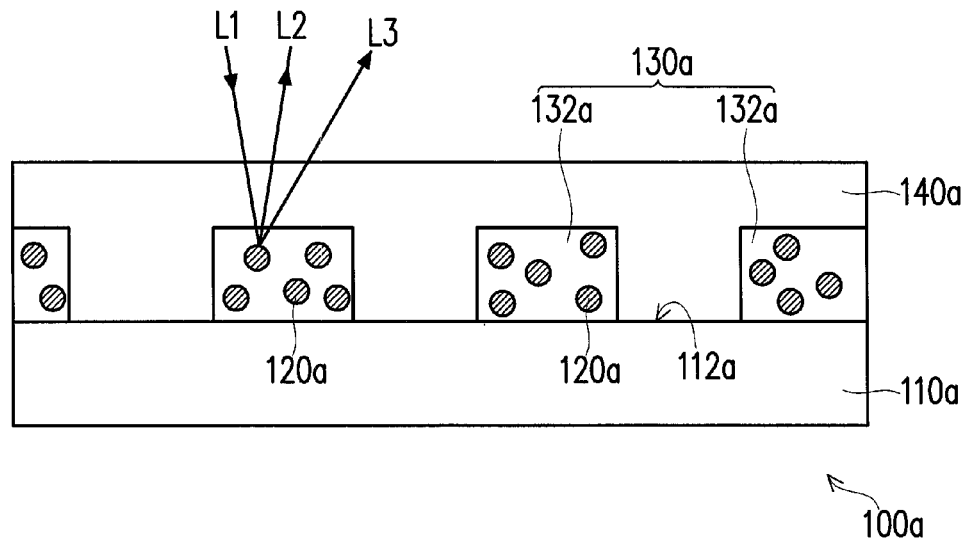
FIG. 1 is a schematic cross-sectional diagram of an optical touch sensing structure according to an embodiment of the invention.

FIG. 1 is a schematic cross-sectional diagram of an optical touch sensing structure according to an embodiment of the invention. With reference to FIG. 1, in the present embodiment, an optical touch sensing structure 100a includes a transparent substrate 110a and a plurality of optical particles with metallic composition 120a. The optical particles with metallic composition 120a are disposed on the transparent substrate 110a. When an infrared L1 is incident on each of the optical particles with metallic composition 120a, the infrared L1 is reflected by each of the optical particles with metallic composition 120a (i.e., as an infrared L2 illustrated in FIG. 1).

In detail, the transparent substrate 110a of the present embodiment is made of, for example, glass, plastic, polymethylmethacrylate (PMMA) or any other material having high transmittance. The transparent substrate 110a has an upper surface 112a. Due to the metallic characteristic, each of the optical particles with metallic composition 120a is highly infrared reflective. Each of the optical particles with metallic composition 120a is, for example, a metallic particle, such as a gold particle, a silver particle, an aluminum particle or an alloy particle consisting of different metals, which is not limited in the invention. Moreover, the diameter of each of the optical particles with metallic composition 120a is in a range between 1 to 30 micrometers (μm).

To be more specific, optical touch sensing structure 100a of the present embodiment further includes a transparent adhesive layer 130a. The transparent adhesive layer 130a is disposed on the transparent substrate 110a, and the optical particles with metallic composition 120a are fixed on the transparent substrate 110a by the transparent adhesive layer 130a. Herein, the refractive index of the transparent substrate 110a is identical or similar to the refractive index of the transparent adhesive layer 130a. Referring to FIG. 1, the transparent adhesive layer 130a includes a plurality of transparent adhesive portions 132a. The transparent adhesive portions 132a are separately disposed on an upper surface 112a of the transparent substrate 110a and expose a portion of the upper surface 112a of the transparent substrate 110a. Specially, the optical particles with metallic composition 120a are randomly distributed in the transparent adhesive portions 132a.

Additionally, the optical touch sensing structure 100a of the present embodiment further includes a transparent protective layer 140a. The transparent protective layer 140a is disposed on the transparent substrate 110a and covers the transparent adhesive portions 132a and the portion of the upper surface 112a of the transparent substrate 110a that is exposed by the transparent adhesive portions 132a. Specially, the refractive index of the transparent protective layer 140a is identical or similar to the refractive index of the transparent substrate 110a and identical or similar to the refractive index of the transparent adhesive layer 130a to improve the light transmittance.

Due to the strong infrared reflectivity of the optical particles with metallic composition 120a of the present embodiment, the transparent substrate 110a, the transparent adhesive portions 132a and the transparent protective layer 140a are relatively weakly infrared reflective. Thus, when a touch device (e.g., an optical stylus which is not shown) emits the infrared L1 onto the optical touch sensing structure 100a, the infrared L1 can be reflected (i.e., as the infrared L2 illustrated in FIG. 1) and scattered (i.e., as an infrared L3 illustrated in FIG. 1) by the optical particles with metallic composition 120a and captured by an infrared camera (not shown) in the touch device, and thereby, an infrared image is formed and is used to calculate the position of the touched point. In the meantime, visible light (not shown) can directly pass through the transparent protective layer 140a, the transparent substrate 110a and the transparent adhesive layer 130a. Thereby, when subsequently installed in front of, for example, a display (not shown), the optical touch sensing structure 100a not only can be an effective reflector for the infrared L1, but also can effectively maintain the light transmittance of the display with much less image fogging, in comparison with paper substrate. Therefore, the optical touch sensing structure 100a of the present embodiment can have wider application.

It should be noted that the reference numerals and a part of the contents of the previous embodiment will be used in the following embodiments, wherein identical reference numerals indicate the same or similar elements, and repeated description of the same technical contents is omitted. For a detailed description of the omitted parts, reference can be found in the previous embodiment, and no repeated description is contained in the following embodiments.

Figure 2:
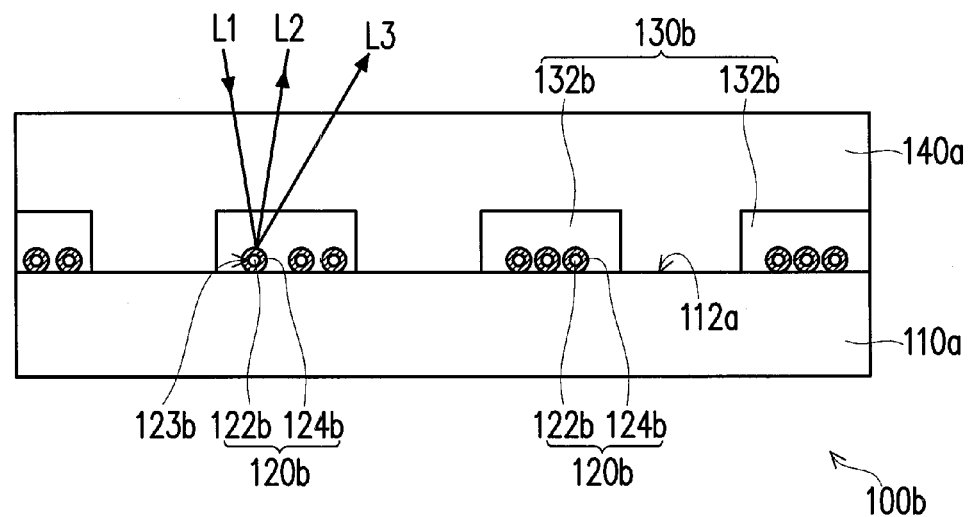
FIG. 2 is a schematic cross-sectional diagram of an optical touch sensing structure according to another embodiment of the invention.

FIG. 2 is a schematic cross-sectional diagram of an optical touch sensing structure according to another embodiment of the invention. With reference to FIG. 2, an optical touch sensing structure 100b of the present embodiment is similar to the optical touch sensing structure 100a illustrated in FIG. 1 though both are different in that each optical particle with metallic composition 120b of the present embodiment is embodied by a glass particle 122b and a metallic layer 124b covering an outer surface 123b of the glass particle 122b. Additionally, the optical particles with metallic composition 120b of the present embodiment are covered by transparent adhesive portions 132b of a transparent adhesive layer 130b and arranged in a single layer on the upper surface 112a of the transparent substrate 110a.

When a touch device (e.g., an optical stylus which is not shown) emits the infrared L1 onto the optical touch sensing structure 100b, the infrared L1 may be reflected (i.e., as the infrared L2 illustrated in FIG. 2) and scattered (i.e., as the infrared L3 illustrated in FIG. 2) by the optical particles with metallic composition 120b and captured by an infrared camera (not shown) in the touch device, and thereby, the position of the touched point may be calculated. With such configuration, the visible light (not shown) can directly pass through the transparent protective layer 140a, the transparent substrate 110a and the transparent adhesive layer 130b, and the optical particles with metallic composition 120b arranged in a single layer will result in less multiple reflection and less multiple scattering of the passing light. Thereby, when subsequently installed in front of, for example, a display (not shown), the optical touch sensing structure 100b not only can be an effective reflector for the infrared L1, but also can effectively maintain the light transmittance of the display with much less image fogging, in comparison with paper substrate. Therefore, the optical touch sensing structure 100b of the present embodiment can have wider application.

Figure 3:
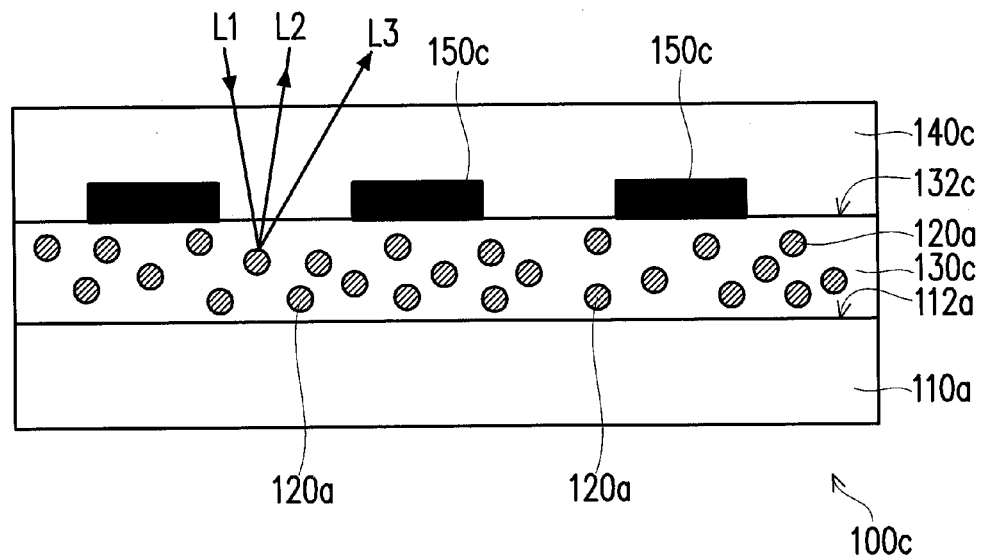
FIG. 3 is a schematic cross-sectional diagram of an optical touch sensing structure according to another embodiment of the invention.

FIG. 3 is a schematic cross-sectional diagram of an optical touch sensing structure according to another embodiment of the invention. With reference to FIG. 3, an optical touch sensing structure 100c of the present embodiment is similar to the optical touch sensing structure 100a illustrated in FIG. 1 though both are different in that a transparent adhesive layer 130c of the present embodiment completely covers the transparent substrate 110a, and the optical particles with metallic composition 120a are randomly distributed in the transparent adhesive layer 130c. Additionally, the optical touch sensing structure 100c of the present embodiment further includes a plurality of light absorbing portions 150c. The light absorbing portions 150c are disposed on the surface 132c of the transparent adhesive layer 130c and expose a portion of the surface 132c of the transparent adhesive layer 130c. A transparent protective layer 140c is disposed on the transparent adhesive layer 130c and covers the light absorbing portions 150c and the portion of surface 132c of the transparent adhesive layer 130c that is exposed by the light absorbing portions 150c. Herein, the light absorbing portions 150c may be considered as dark spots reflecting neither the visible light nor the infrared, which is made of black ink, but the invention is not limited thereto.

When a touch device (e.g., an optical stylus which is not shown) emits the infrared L1 onto the optical touch sensing structure 100c, the infrared L1 can be reflected (i.e., as an infrared. L2 illustrated in FIG. 3) and scattered (i.e., as the infrared L3 illustrated in FIG. 3) by the optical particles with metallic composition 120a and captured by an infrared camera (not shown) in the touch element, while the infrared is not reflected by the light absorbing portions 150c. This results in a reflected infrared image, such that the position of a touched point may be calculated. With this configuration the visible light (not shown) can directly pass through the transparent protective layer 140c, the transparent substrate 110a and the transparent adhesive layer 130c. However, both the visible light and the infrared L1 will be absorbed by the light absorbing portions 150c, so the optical touch sensing structure 100c will produce greater reflectivity difference for touch sensing structure, in comparison with the optical touch sensing structure 100a (illustrated in FIG. 1) and 100b (illustrated in FIG. 2). Accordingly, when subsequently installed in front of, for example, a display (not shown), the optical touch sensing structure 100c not only can be an effective reflector for the infrared L1, but also can effectively maintain the light transmittance of the display with much less image fogging, in comparison with paper substrate. Therefore, the optical touch sensing structure 100c of the present embodiment can have wider application.

Figure 4:
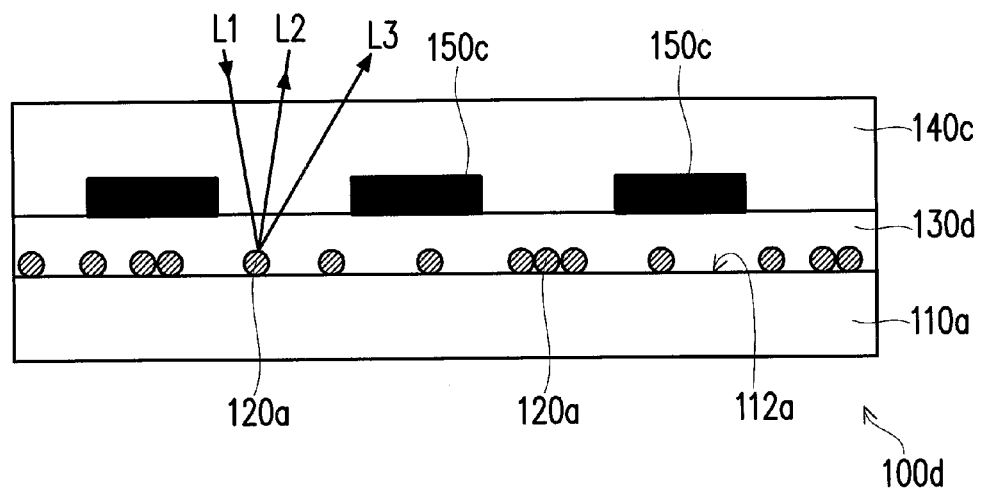
FIG. 4 is a schematic cross-sectional diagram of an optical touch sensing structure according to another embodiment of the invention.

FIG. 4 is a schematic cross-sectional diagram of an optical touch sensing structure according to another embodiment of the invention. With reference to FIG. 4, an optical touch sensing structure 100d of the present embodiment is similar to the optical touch sensing structure 100c illustrated in FIG. 3 though both are different in that the optical particles with metallic composition 120a of the present embodiment is covered by a transparent adhesive layer 130d and arranged in a single layer on the upper surface 112a of the transparent substrate 110a. Compared with the optical particles with metallic composition 120a illustrated in FIG. 3 which are randomly distributed, the thickness of the transparent adhesive layer 130d can be less than that of the transparent adhesive layer 130c illustrated in FIG. 3, such that the overall thickness of the optical touch sensing structure 100d can be reduced. Additionally, the optical particles with metallic composition 120a arranged in a single layer will result in less multiple reflection and less multiple scattering of the passing light. Thereby, when subsequently installed in front of, for example, a display (not shown), the optical touch sensing structure 100d not only can be an effective reflector for the infrared L1, but also can effectively maintain the light transmittance of the display with much less image fogging, in comparison with paper substrate. Therefore, the optical touch sensing structure 100d of the present embodiment can have wider application.

Figure 5:
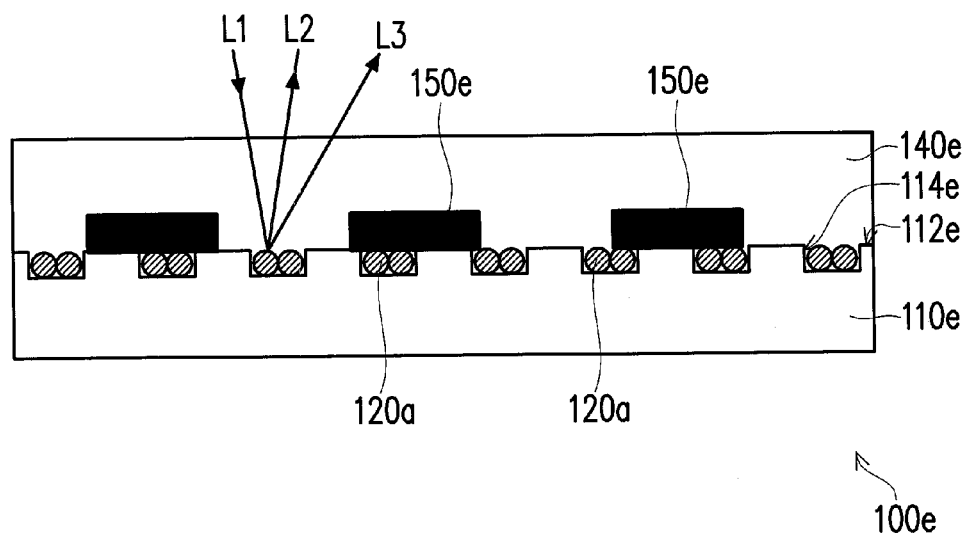
FIG. 5 is a schematic cross-sectional diagram of an optical touch sensing structure according to another embodiment of the invention.

FIG. 5 is a schematic cross-sectional diagram of an optical touch sensing structure according to another embodiment of the invention. With reference to FIG. 5, an optical touch sensing structure 100e of the present embodiment is similar to the optical touch sensing structure 100c illustrated in FIG. 3 though both are different in that the transparent substrate 110e of the present embodiment has a plurality of cavities 114e, and the optical particles with metallic composition 120a are disposed in the cavities 114e and arranged in a single layer. In other words, in the present embodiment, the cavities 114e of the transparent substrate 110e are used to fix the positions of the optical particles with metallic composition 120a.

Thereby, in the present embodiment, the positions of the optical particles with metallic composition 120a may be fixed without using the transparent adhesive layers 130a, 130b, 130c and 130d which are illustrated in FIG. 1 through FIG. 4, such that the overall thickness of the optical touch sensing structure 100e may be further reduced. Additionally, light absorbing portions 150e are disposed on a portion of an upper surface 112e of the transparent substrate 110e and cover a portion of the optical particles with metallic composition 120a. The light absorbing portions 150e expose at least a portion of the cavities 114e and a portion of the optical particles with metallic composition 120a which are located in the cavities 114e. The transparent protective layer 140e is disposed on the transparent substrate 110e and at least covers the light absorbing portions 150e, the portion of the cavities 114e exposed by the light absorbing portions 150e and the portion of the optical particles with metallic composition 120a which are located in the cavities 114e.

Figure 6:
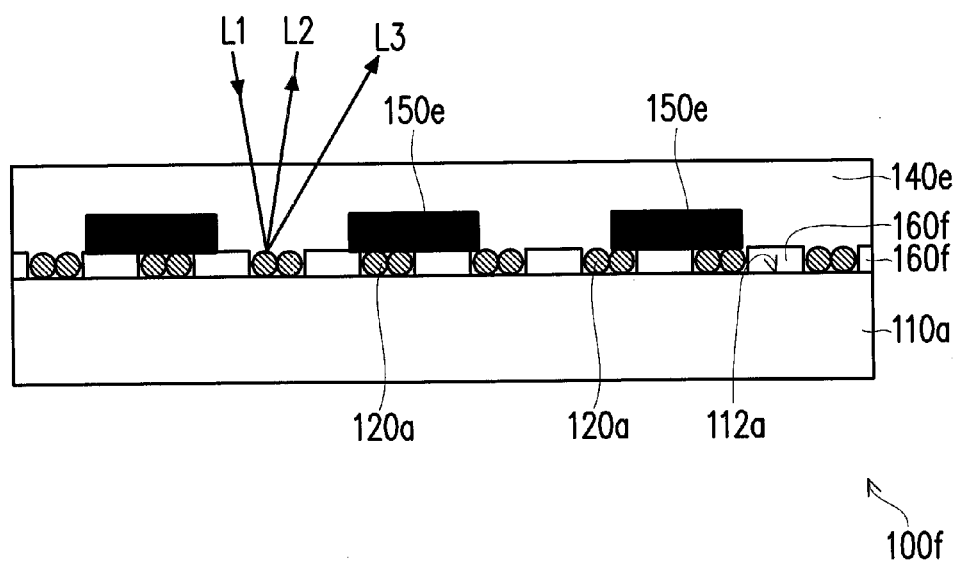
FIG. 6 is a schematic cross-sectional diagram of an optical touch sensing structure according to another embodiment of the invention.

FIG. 6 is a schematic cross-sectional diagram of an optical touch sensing structure according to another embodiment of the invention. With reference to FIG. 6, an optical touch sensing structure 100f is similar to the optical touch sensing structure 100e illustrated in FIG. 5 though both are different in that a plurality of transparent positioning portions 160f is disposed in the optical touch sensing structure 100f in substitution for the design of the cavities 114e illustrated in FIG. 5. In detail, the optical touch sensing structure 100f of the present embodiment further includes the transparent positioning portions 160f. The transparent positioning portions 160f are disposed on the transparent substrate 110a, and the optical particles with metallic composition 120a are disposed between the transparent positioning portions 160f and arranged in a single layer. Positions of the optical particles with metallic composition 120a are limited by the transparent positioning portions 160f and thus, the transparent adhesive layers 130a, 130b, 130c and 130d illustrated in FIG. 1 through FIG. 4 are not needed, which is different from the way of fixing the optical particles with metallic composition. 120a It should be mentioned that in other embodiments that are not illustrated, the optical particles with metallic composition 120b made of the glass particles 122b and the metallic layers 124b covering the outer surfaces 123b of the glass particles 122b illustrated in FIG. 2 may also be used. Technicians skilled in this are may refer to the description in connection with the above embodiments to select the aforementioned elements according their actual requirements to achieve desired technical effects.

In light of the foregoing, the optical touch sensing structure of the invention includes the transparent substrate and the optical particles with metallic composition, and thus, when a touch device (e.g., an optical stylus) emits the infrared onto the optical touch sensing structure, the visible light is allowed to pass through the transparent substrate, and the infrared is reflected by the optical particles with metallic composition to the infrared camera in the touch device, such that the position of the touched point can be calculated according to the reflected infrared image. Moreover, when the optical touch sensing structure of the invention is subsequently applied to, for example, a common display (e.g., a liquid crystal display, a CRT monitor, or a plasma display), the light transmittance of the display can still be maintained with much less image fogging, in comparison with paper substrate. Therefore, the optical touch sensing structure of the invention has wider application.

It will be apparent to those skilled in the art that various modifications and variations can be made to the structure of the disclosed embodiments without departing from the scope or spirit of the invention. In view of the foregoing, it is intended that the disclosure cover modifications and variations of this specification provided they fall within the scope of the following claims and their equivalents.

What is claimed is:

1. An optical touch sensing structure, comprising:
   a transparent substrate; and
   a plurality of optical particles with metallic composition, disposed on the transparent substrate, wherein when an infrared is incident on each of the optical particles with metallic composition, the infrared is reflected by each of the optical particles with metallic composition;
   a transparent adhesive layer, disposed on the transparent substrate, wherein a refractive index of the transparent adhesive layer is identical or similar to a refractive index of the transparent substrate, and the optical particles with metallic composition are fixed on the transparent substrate by the transparent adhesive layer, the transparent adhesive layer completely covers the transparent substrate and the optical particles with metallic composition are distributed in the transparent adhesive layer;
   a plurality of light absorbing portions, disposed on the transparent adhesive layer and exposing a portion of the transparent adhesive layer; and
   a transparent protective layer, disposed on the transparent adhesive layer and covering the light absorbing portions and the portion of the transparent adhesive layer exposed by light absorbing portions, wherein a refractive index of the transparent protective layer is identical or similar to the refractive index of the transparent substrate and identical or similar to the refractive index of the transparent adhesive layer.

2. The optical touch sensing structure as recited in claim 1, wherein each of the optical particles with metallic composition is a metallic particle or composed of a glass particle and a metallic layer covering an outer surface of the glass particle.

3. The optical touch sensing structure as recited in claim 1, wherein a diameter of each of the optical particles with metallic composition is in a range between 1 to 30 micrometers.

4. An optical touch sensing structure, comprising:
   a transparent substrate; and
   a plurality of optical particles with metallic composition, disposed on the transparent substrate, wherein when an infrared is incident on each of the optical particles with metallic composition, the infrared is reflected by each of the optical particles with metallic composition;
   a transparent adhesive layer, disposed on the transparent substrate, wherein a refractive index of the transparent adhesive layer is identical or similar to a refractive index of the transparent substrate, and the optical particles with metallic composition are fixed on the transparent substrate by the transparent adhesive layer, the transparent adhesive layer completely covers an upper surface of the transparent substrate and the optical particles with metallic composition are covered by the transparent adhesive layer and arranged in a single layer on the upper surface;
   a plurality of light absorbing portions, disposed on the transparent adhesive layer and exposing a portion of the transparent adhesive layer; and
   a transparent protective layer, disposed on the transparent adhesive layer and covering the light absorbing portions and the portion of the transparent adhesive layer exposed by light absorbing portions, wherein a refractive index of the transparent protective layer is identical or similar to the refractive index of the transparent substrate and identical or similar to the refractive index of the transparent adhesive layer.

5. The optical touch sensing structure as recited in claim 4, wherein each of the optical particles with metallic composition is a metallic particle or composed of a glass particle and a metallic layer covering an outer surface of the glass particle.

6. The optical touch sensing structure as recited in claim 4, wherein a diameter of each of the optical particles with metallic composition is in a range between 1 to 30 micrometers.

7. An optical touch sensing structure, comprising:
a transparent substrate, having a plurality of cavities; and
a plurality of optical particles with metallic composition, disposed on the transparent substrate, wherein when an infrared is incident on each of the optical particles with metallic composition, the infrared is reflected by each of the optical particles with metallic composition, and the optical particles with metallic composition are disposed in the cavities and arranged in a single layer;
a plurality of light absorbing portion, disposed on the transparent substrate and at least exposing a portion of the optical particles with metallic composition; and
a transparent protective layer, disposed on the transparent substrate and at least covering the light absorbing portions and the portion of the optical particles with metallic composition exposed by the light absorbing portions, wherein a refractive index of the transparent protective layer is identical or similar to the refractive index of the transparent substrate.

8. The optical touch sensing structure as recited in claim 7, wherein each of the optical particles with metallic composition is a metallic particle or composed of a glass particle and a metallic layer covering an outer surface of the glass particle.

9. The optical touch sensing structure as recited in claim 7, wherein a diameter of each of the optical particles with metallic composition is in a range between 1 to 30 micrometers.

10. An optical touch sensing structure, comprising:
a transparent substrate; and
a plurality of optical particles with metallic composition, disposed on the transparent substrate, wherein when an infrared is incident on each of the optical particles with metallic composition, the infrared is reflected by each of the optical particles with metallic composition;
a plurality of transparent positioning portions, disposed on the transparent substrate, wherein the optical particles with metallic composition are disposed between the transparent positioning portions and arranged in a single layer, and the transparent positioning portions limit positions of the optical particles with metallic composition;
a plurality of light absorbing portion, disposed on the transparent substrate and at least exposing a portion of the optical particles with metallic composition; and
a transparent protective layer, disposed on the transparent substrate and at least covering the light absorbing portions and the portion of the optical particles with metallic composition exposed by the light absorbing portions, wherein a refractive index of the transparent protective layer is identical or similar to the refractive index of the transparent substrate.

11. The optical touch sensing structure as recited in claim 10, wherein each of the optical particles with metallic composition is a metallic particle or composed of a glass particle and a metallic layer covering an outer surface of the glass particle.

12. The optical touch sensing structure as recited in claim 10, wherein a diameter of each of the optical particles with metallic composition is in a range between 1 to 30 micrometers.

* * * * *